United States Patent
Gutkuhn et al.

(10) Patent No.: US 9,003,589 B2
(45) Date of Patent: Apr. 14, 2015

(54) FLOOR OF A DOME MODULE AS AN INTERFACE BETWEEN AN AIR PASSENGER BRIDGE OR AIR PASSENGER STAIRS AND AN AIRPLANE

(75) Inventors: Detlef Gutkuhn, Espenau (DE); Lothar Scharf, Bad Sooden-Allendorf (DE)

(73) Assignee: Hübner GmbH & Co. KG, Kassel (DE)

( * ) Notice: Subject to any disclaimer, the term of this patent is extended or adjusted under 35 U.S.C. 154(b) by 719 days.

(21) Appl. No.: 13/197,484

(22) Filed: Aug. 3, 2011

(65) Prior Publication Data
US 2012/0145831 A1 Jun. 14, 2012

(30) Foreign Application Priority Data
Dec. 8, 2010 (DE) .................................. 10 015 408

(51) Int. Cl.
*B64D 9/00* (2006.01)
*B64F 1/305* (2006.01)

(52) U.S. Cl.
CPC ...................................... *B64F 1/305* (2013.01)

(58) Field of Classification Search
USPC ........... 244/137.2, 137.1; 14/71.5, 71.1, 69.5; 52/173.2
See application file for complete search history.

(56) References Cited

U.S. PATENT DOCUMENTS

| | | | |
|---|---|---|---|
| 3,641,604 A * | 2/1972 | Eggert, Jr. ...................... | 14/71.5 |
| 3,964,118 A | 6/1976 | Meyers et al. | |
| 4,490,869 A * | 1/1985 | Morin ............................. | 14/71.5 |
| 4,553,720 A | 11/1985 | Harder | |
| 2002/0138924 A1* | 10/2002 | Rolfe et al. .................... | 14/71.5 |
| 2005/0217039 A1* | 10/2005 | Tholen et al. .................. | 14/71.5 |

FOREIGN PATENT DOCUMENTS

WO WO-99/50143 A2 10/1999

* cited by examiner

*Primary Examiner* — Brian M O'Hara
(74) *Attorney, Agent, or Firm* — Gifford, Krass, Sprinkle, Anderson & Citkowski, P.C.

(57) ABSTRACT

The subject matter of the invention is a floor of a dome module as an interface between an air passenger bridge or air passenger stairs and the airplane, wherein the floor comprises a stationary floor section and a floor head part, wherein the floor head part exhibits several floor segments, which are connected to one another by a buffer cross-beam that is flexible over at least a portion of its length, wherein several floor segments are horizontally displaceable relative to one another.

28 Claims, 5 Drawing Sheets

FLOOR OF A DOME MODULE AS AN INTERFACE BETWEEN AN AIR PASSENGER BRIDGE OR AIR PASSENGER STAIRS AND AN AIRPLANE

CROSS-REFERENCE TO RELATED APPLICATIONS

This application claims priority of German Patent Application DE 10 015 408.7-2422 filed Dec. 8, 2010.

FIELD OF THE INVENTION

The invention relates to the floor of a dome module as an interface between an air passenger bridge or air passenger stairs and an airplane, wherein the floor comprises a stationary floor section and a floor head part.

BACKGROUND OF THE INVENTION

Air passenger bridges are sufficiently well known from the prior art. Air passenger bridges are used for transferring persons from the airplane directly into the airport terminal. Since the airport terminal is usually higher than the door opening of the airplane, the air passenger bridges, which are held on the front end by an undercarriage, frequently run diagonally downward in the direction of the door opening of the airplane. At the lower end of the passenger bridge the air passenger bridge exhibits a cabin that can be rotated up to 90° to the longitudinal axis of the air passenger bridge, wherein on the front end a dome module is arranged for transfer from the cabin to the airplane. In similar fashion a dome module is also provided for air passenger stairs as an interface for transfer to the airplane.

The dome module as an interface between the actual air passenger bridge or the air passenger stairs and the airplane comprises according to the prior art a floor as well as a U-shaped bellows spanning the floor as a roof. The bellows likewise exhibits a so-called U-shaped rotary bumper, wherein the bellows, in order to ensure contact over the entire area of the U-shaped bellows on the front end on the skin of the airplane, can be moved out to variable extents on both sides. This problem is, in and of itself, sufficiently known. Regarding the floor it is known from the prior art that the floor exhibits a stationary element and a floor head part, said floor head part as a whole being horizontally displaceable relative to the stationary floor element. However, this means that when such a dome module is attached in the region of the front end of an airplane, that is, in the region of the transition to the cockpit, a gap then remains at least in the direction of the cockpit. When the airplane door swings open outward, the gap or at least a part of the gap is covered by the airplane door upward. If this is not the case, that is, if the door for example opens inward, then a barrier must be used to prevent persons from getting into the region of this gap. In this respect it is also known to design the floor in two parts, wherein the one part of the floor is outwardly pivotable in the direction of the airplane. It can be immediately understood that with such a solution on the one hand a formation of a gap between the fuselage of the airplane and the front side of the floor can be lessened but not completely prevented.

SUMMARY OF THE INVENTION

Consequently the invention addresses the problem of providing a floor of a dome module as an interface between an air passenger bridge or air passenger stairs of the initially named type with which an essentially gap-free transition from the floor of the dome module to the airplane fuselage is made possible.

For solution of this problem in the case of a floor of the initially named type it is proposed that the floor head part exhibits several floor segments which are connected to one another by means of a flexible buffer cross-beam, wherein the several floor segments are horizontally displaceable relative to one another. Through the buffer cross-beam that is flexible in longitudinal direction, on which the individual floor segments are arranged on the top, it is now possible to provide an essentially gap-free transition from the floor of the dome module to the skin of the airplane in dependency on the size of the individual floor segments. On the ends opposite the buffer cross-beam the floor elements are connected to the stationary floor section. The floor head part is held by guide elements in guide receptacles on the floor of the dome module on the stationary floor section.

Advantageous features and embodiments of the invention can be found in the dependent claims.

Thus according to a special feature of the invention provision is in particular made that the floor exhibits a drive device for horizontal displacement for horizontal displacement of the floor segments. From this it becomes clear that the individual floor segments are horizontally, i.e. in the direction of the airplane fuselage, displaceable, to be precise by means of a drive device in order to make possible an automatic placement of the floor on the skin of the airplane.

The drive device itself comprises in particular several, in particular two spring elements which are advantageously constructed as gas springs which are firmly mounted on their one end, e.g. on the floor frame, and on their other end are connected to the flexible and displaceable buffer cross-beam.

In particular it has proved to be advantageous that a pulling device is provided for the retraction of one or more floor segments, wherein the pulling device counteracts the force of the spring elements and here in particular of the gas springs. This means that the gas springs press the buffer cross-beam outward over its length in horizontal direction, but the pulling device counteracts it, so that by actuating the pulling device a contact for the purpose of pressing the buffer cross-beam against the skin of the airplane is made possible. The pulling device comprises at least two straps, wherein the at least two straps, spaced apart from one another are connected to the flexible buffer cross-beam. In particular in this connection provision is made that a longer spring element, for example a gas spring, is arranged on the one end of the flexible buffer cross-beam which is to be pivoted outward the furthest, while the second shorter spring element is arranged at a position of the flexible buffer cross-beam from where the buffer cross-beam runs essentially straight, thus does not undergo an arc-shaped displacement, but rather, if necessary, can be extended only by a small amount. However, in this connection it is also conceivable to provide three spring elements, to be precise arranging one spring element in about the center of the flexible buffer cross-beam and linking the two remaining spring elements to the end of the cross-beam. In this respect it is then possible to also reproduce a circular-arc-shaped arch, which with regard to the skin of different airplane types is likewise of interest.

According to a further feature of the invention the pulling device comprises a tubular motor drive, wherein the tubular motor drive exhibits at least two spring-loaded rollers for holding straps. A tubular motor drive is embodied as a tube which is put in rotation by means of a motor arranged therein. There are at least two spring-loaded rollers on the outer jacket of the tubular motor drive.

It has already been mentioned elsewhere that the spring elements, in particular the gas springs, carry out a different path in horizontal direction. In the case of corresponding arrangement of the at least two straps this results in the number of revolutions of the tubular motors for release of the strap for the outgoing movement of the flexible buffer cross-beam being adjusted in accordance with the greatest displacement of the spring element which can be folded out the most. However, this means that the other strap, likewise arranged on a spring-loaded roller, whose outgoing path is shorter, is likewise pulled out shorter. Since the number of revolutions of the tubular motors over its length is however the same, this results in the strap sagging. Through the use of spring-loaded rollers the excess strap length can be compensated.

According to another feature of the invention the floor segments are displaceably connected to one another vertically offset to one another. This against the background that in the case of a pivoting movement of the buffer cross-beam the floor segments connected to it execute a likewise arc-shaped movement, and in this respect due to the vertically offset arrangement of the floor segments to one another an overlapping is made possible. In this connection provision is further made that the floor segments are pivotably connected to the flexible buffer cross-beam by vertical axes.

To prevent damage from occurring when the buffer cross-beam comes into contact with the airplane skin, the buffer cross-beam, which can for example be made of a spring steel, exhibits an elastic impact buffer (bumper) on the exterior front side.

BRIEF DESCRIPTION OF THE DRAWINGS

The invention will be explained in greater detail in the following with the help of the drawings.

DETAILED DESCRIPTION OF THE PREFERRED EMBODIMENTS

Figure 1:
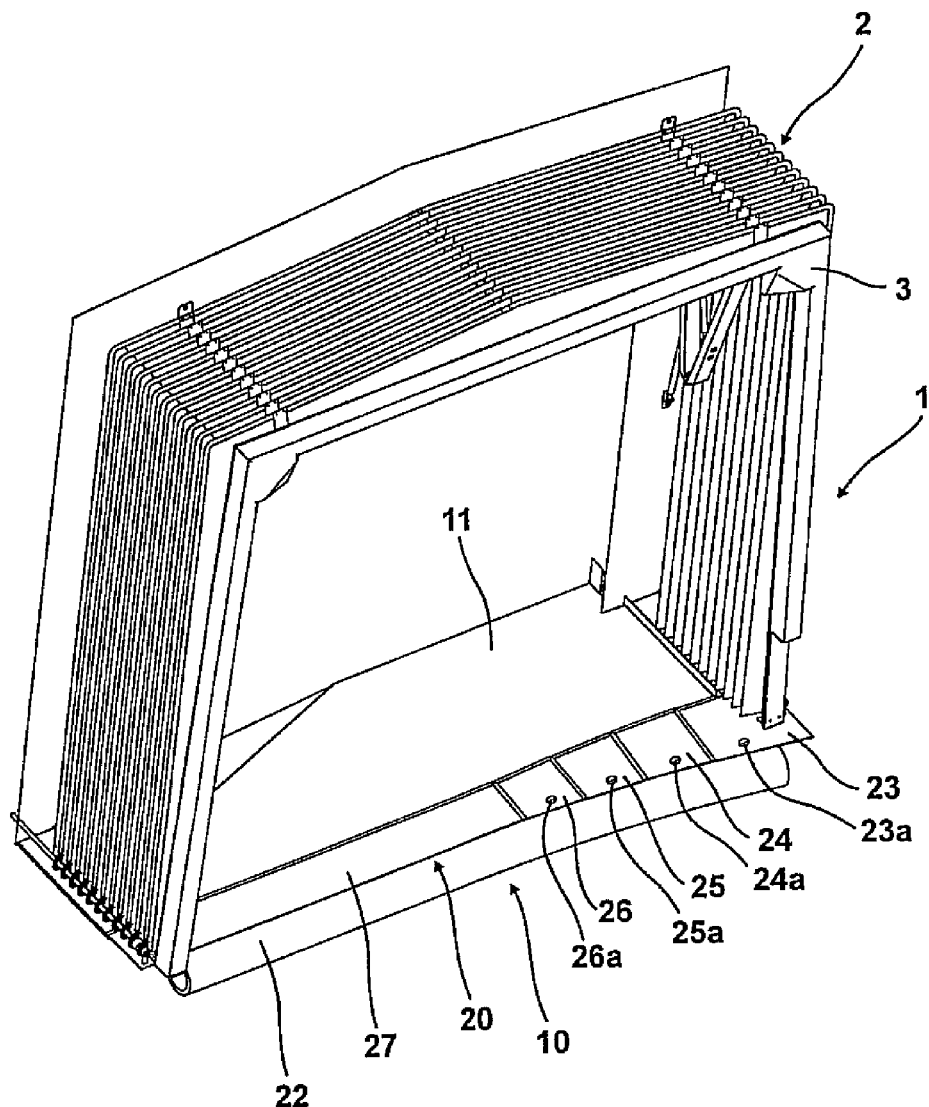
FIG. 1 shows the dome module in perspective in a diagonal view from above.

The dome module, which is labeled 1, comprises the U-shaped constructed bellows 2 with the bumper 3 arranged on the front side. The floor of the dome module is labeled 10. The floor 10 comprises a stationary floor section 11 and the floor head part 20. The subject matter of the invention is now the horizontal displaceability of the floor head parts 20 relative to the stationary floor section 11. In this connection, for the following discussions reference is made to the drawings in accordance with FIG. 2.

Figure 2:
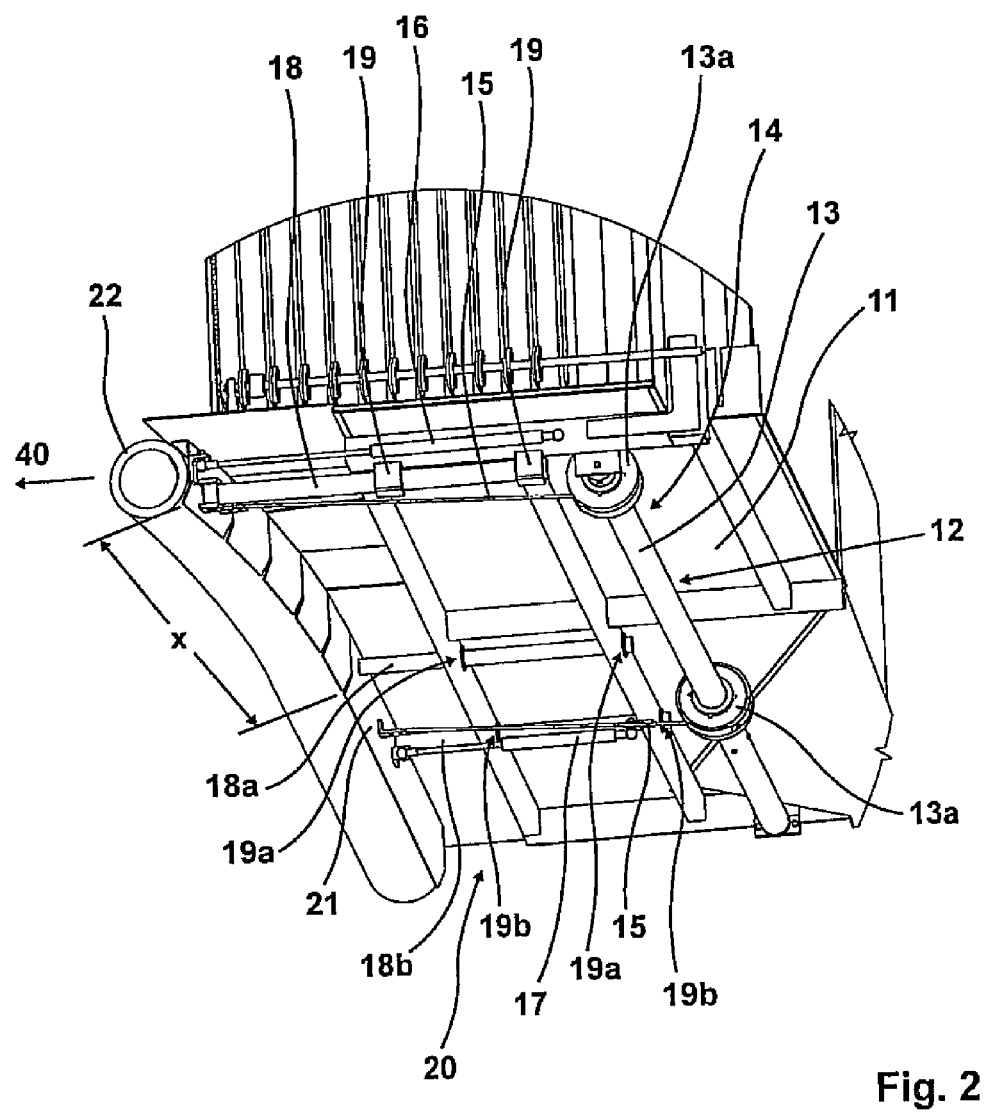
FIG. 2 shows a perspective view from below on the floor of the dome module.

From FIG. 2 in this connection under the stationary floor section 11 a framework construction arises, which holds the pulling device, labeled 12. The pulling device labeled 12 comprises the tubular motor drive 13 with the two spring-loaded rollers 13a on the tube of the tubular motor drive. The motor of the drive is located in the tube and is in this respect not visible.

Each spring-loaded roller has a strap 15 assigned to it, said strap being connected to the flexible buffer cross-beam 21, as arises in particular also from FIG. 2. In addition, on the underside of the floor section 11 two gas springs 16, 17 are fastened, which are arranged in articulate manner with their one end to the flexible buffer cross beam 21. The gas springs are variable in length and exhibit to this extent a varying extraction width. Guide elements 18, 18a and 18b are provided for the guiding of the flexible buffer cross-beam 21. Guide element 18 is constructed as a rectangular tube which is guided into corresponding guide receptacles 19 on the underside of the floor section 11, as likewise arises in view of FIG. 2. Guide elements 18a and 18b are constructed as round bars which are displaceably guided in corresponding receptacles 19a and 19b within the frame of the floor.

The buffer cross-beam 21 is constructed elastically resilient over the longitudinal section X, e.g. by using a spring steel. It is mentioned here that the invention also comprises a buffer cross-beam 21 which is constructed elastically resilient over its entire length. The buffer cross-beam 21 exhibits the bumper 22 on its front.

On the top of the buffer cross-beam 21 there are, as arises already in the view of FIG. 1, several floor segments 23, 24, 25, 26 and 27, which form the floor head part 20. The pivotable linking of floor segments 23 through 26 to the buffer cross-beam takes place via axes 23a through 26a. That means floor segments 23 through 26 are moveably held around these axes 23a through 26a by the buffer cross-beam 21, which is necessary when the buffer cross-beam is supposed to swing out over its length X in the direction of the arrow 40.

Figure 3:
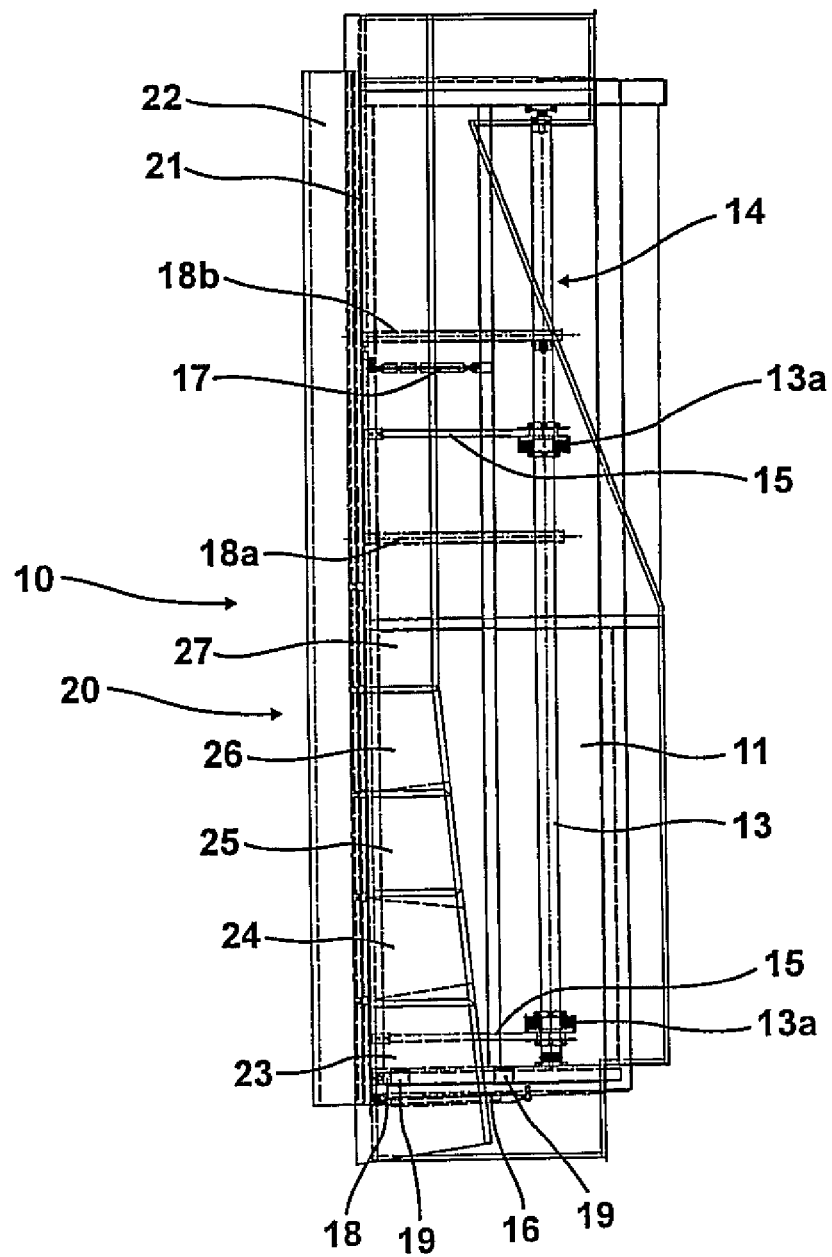
FIG. 3 shows a view from below on the floor in retracted state of the floor head parts.
Figure 5:
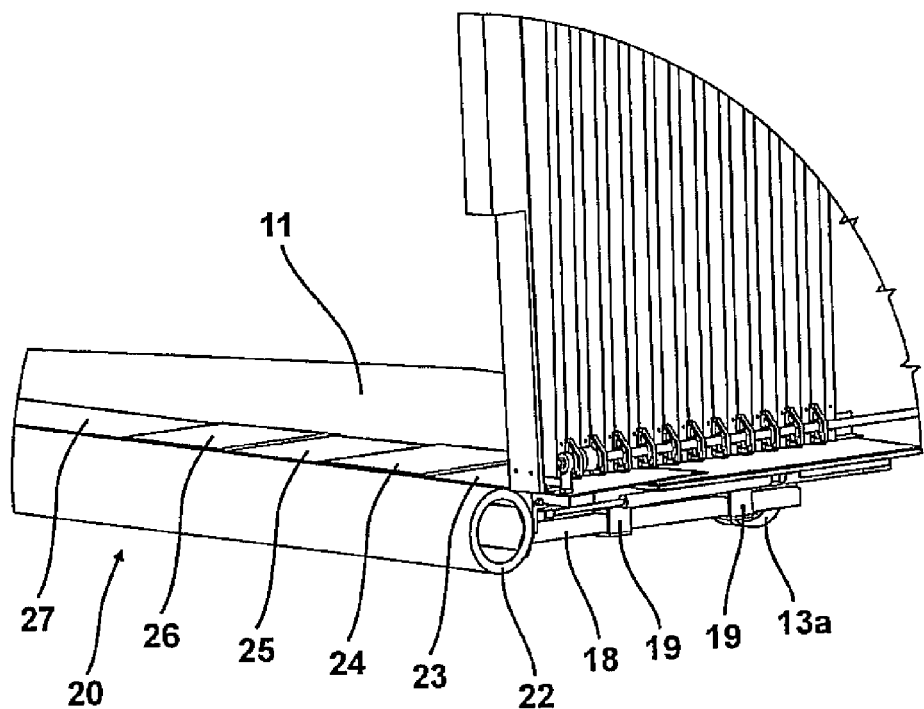
FIG. 5 shows a perspective lateral view.

As can be gathered from the drawings and in particular here from FIG. 5, the individual floor segments 23 through 26 are held vertically offset to one another on a rotating basis on the buffer cross-beam by the respective axes 23a through 26a. That means that the individual floor segments 23 through 26 can be moved relative to one another one the plane against one another, as is required when the buffer cross-beam swings out in the direction of the arrow 40 and the floor segments 23 through 26 move to one another to this extent in the front region of the crass-beam. In the starting position, as shown in FIG. 3, the individual floor segments are mounted overlapping on their rear ends. In the case of the outgoing movement this overlapping partially peters out, but is always preserved with a specified amount.

In the present case the floor segment 27 essentially does not pivot outward, wherein however reference is once more made to the fact that floor segment 27 can also be subdivided into further partial segments if this is necessary corresponding to the airplane type for a gap-free contact of the floor to the outer contour of the airplane.

Figure 4:
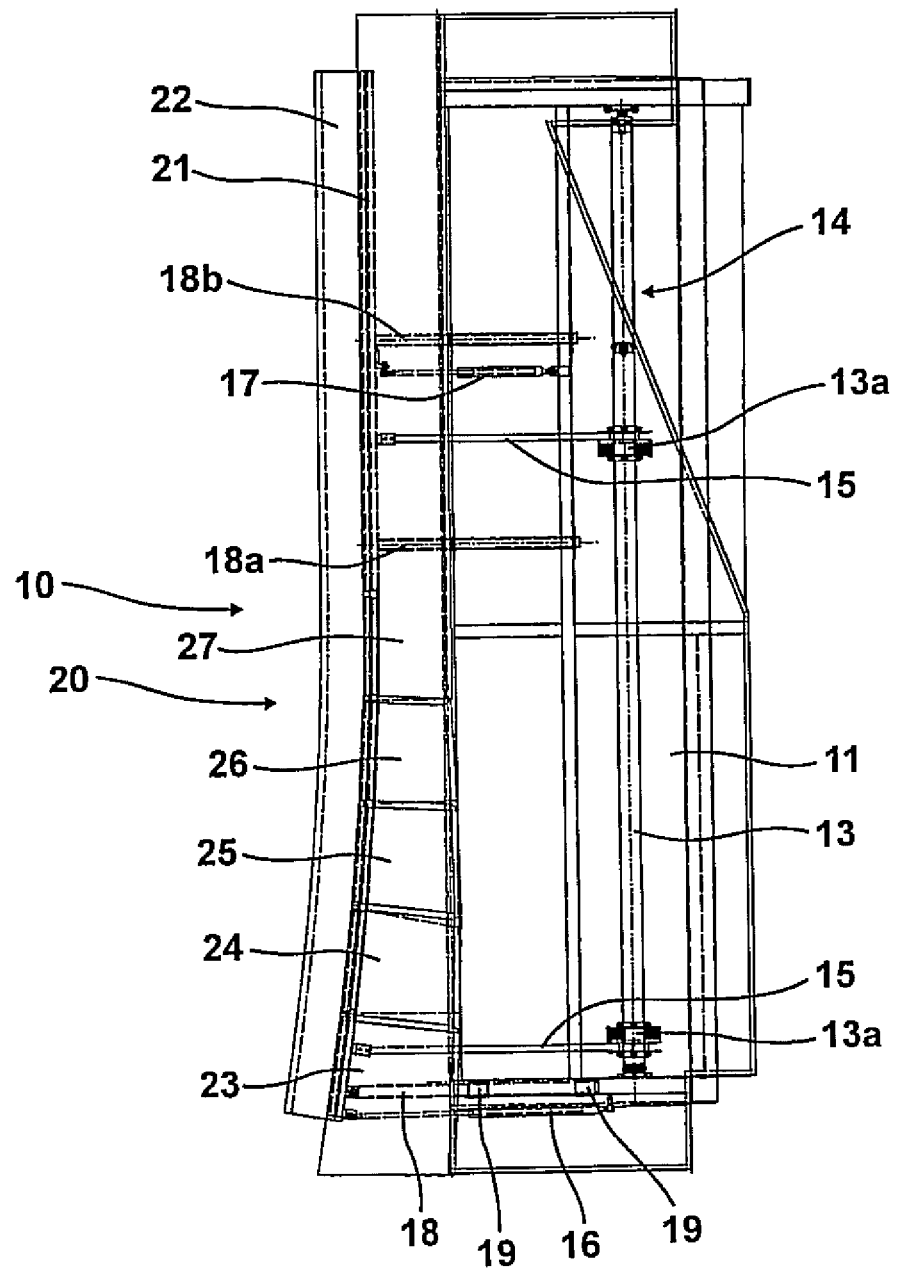
FIG. 4 shows a view in accordance with FIG. 3, however in extended state of the floor head parts.

The floor segments, which can be rotated, are mounted horizontally moveable under the stationary floor section, in order to preclude the development of any gaps in the floor in the case of an outward pivoting movement (FIG. 3, FIG. 4).

The following procedure is employed for the placement of the buffer cross-beam. If the floor is still at somewhat of a distance from the airplane fuselage, the floor head part 20 is folded out first in the direction of the airplane fuselage, thus horizontally. The maximum outgoing path over the entire width of the floor is predefined by the size of the smallest gas spring 17. The outgoing path of gas spring 16 is longer, wherein in this respect a contour conformal placement of the buffer cross beam is possible. In the case of extension the strap forms a reserve in the region of the shortest gas spring which is held by the spring-loaded roller.

The pulling device with the two straps is used to retract the floor head parts. The tubular motor runs until also strap 15 in the region of the longer gas spring 16 has completely rolled up on the spring-loaded roller 13a. The spring of the spring-loaded roller 13a in the region of gas spring 17 is then tight after adjustment of the gas spring. The "reserve" of springs formed in this connection then ensures that in the rotation of the tubular motor strap 15 the spring-loaded roller 13*a* does not sag when gas spring 16 reaches its end position.

The invention claimed is:

1. A floor of a dome module which functions as an interface between an air passenger bridge or air passenger stairs and an airplane, wherein said floor comprises:
   a stationary floor section connected to an air passenger bridge or an air passenger stairs;
   a buffer cross-beam having a front side, the buffer cross-beam being flexible over at least a portion of its length;
   a bumper disposed on the front side of the buffer cross-beam; and
   a movable floor head part having a plurality of floor segments, each floor segment being connected to the buffer cross-beam, the plurality of floor segments being horizontally and linearly displaceable relative to one another and relative to the stationary floor section.

2. The floor of a dome module according to claim 1, wherein the plurality of floor segments are disposed on top of the buffer cross-beam.

3. The floor of a dome module according to claim 1, wherein the plurality of floor segments that are displaceable relative to one another overlap and extend from the stationary floor section in an extended position.

4. The floor of a dome module according to claim 1, wherein said floor includes a drive device for horizontal displacement of the floor segments.

5. The floor of a dome module according to claim 4, wherein the drive device comprises a plurality of spring elements, each of which has a first end and a second end, wherein said spring elements are each fixedly mounted at said first end, and are connected to the buffer cross-beam at said second end.

6. The floor of a dome module according to claim 5, wherein the spring elements are constructed as gas springs.

7. The floor of a dome module according to claim 5, wherein the spring elements have a variable extraction length.

8. The floor of a dome module according to claim 4, further including a pulling device which comprises a part of the drive device for the retraction of one or more of said floor segments.

9. The floor of a dome module according to claim 8, wherein the pulling device comprises at least two straps.

10. The floor of a dome module according to claim 9, wherein the pulling device comprises a tubular motor drive which includes at least two spring-loaded rollers for engaging said straps.

11. The floor of a dome module according to claim 1, wherein the buffer cross-beam is displaceably guided by guide elements to guide receptacles.

12. The floor of a dome module according to claim 1, wherein the floor segments are displaceably connected to one another so as to be vertically offset to one another.

13. The floor of a dome module according to claim 1, wherein the floor segments are pivotably connected to the flexible buffer cross-beam by vertical axes.

14. The floor of a dome module according to claim 1, wherein the flexible buffer cross-beam is made of a flexible material.

15. A floor of a dome module which functions as an interface between an air passenger bridge or air passenger stairs and an airplane, wherein said floor comprises:
   a stationary floor section connected to an air passenger bridge or an air passenger stairs;
   a buffer cross-beam having a front side, the buffer cross-beam being flexible over at least a portion of its length;
   a bumper disposed on the front side of the buffer cross-beam; and
   a movable floor head part having a plurality of floor segments disposed adjacent to each other in a side-by-side arrangement along the length of the cross-beam, each floor segment being connected to the buffer cross-beam, at least some of the floor segments being horizontally and linearly displaceable relative to one another.

16. The floor of a dome module according to claim 15, wherein the plurality of floor segments are disposed on top of the buffer cross-beam.

17. The floor of a dome module according to claim 15, wherein the at least some of the floor segments that are displaceable relative to one another overlap and extend from the stationary floor section in an extended position.

18. The floor of a dome module according to claim 15, wherein said floor includes a drive device for horizontal displacement of the floor segments.

19. The floor of a dome module according to claim 18, wherein the drive device comprises a plurality of spring elements, each of which has a first end and a second end, wherein said spring elements are each fixedly mounted at said first end, and are connected to the buffer cross-beam at said second end.

20. The floor of a dome module according to claim 19, wherein the spring elements are constructed as gas springs.

21. The floor of a dome module according to claim 19, wherein the spring elements have a variable extraction length.

22. The floor of a dome module according to claim 18, further including a pulling device which comprises a part of the drive device for the retraction of one or more of said floor segments.

23. The floor of a dome module according to claim 22, wherein the pulling device comprises at least two straps.

24. The floor of a dome module according to claim 23, wherein the pulling device comprises a tubular motor drive which includes at least two spring-loaded rollers for engaging said straps.

25. The floor of a dome module according to claim 15, wherein the buffer cross-beam is displaceably guided by guide elements to guide receptacles.

26. The floor of a dome module according to claim 15, wherein the floor segments are displaceably connected to one another so as to be vertically offset to one another.

27. The floor of a dome module according to claim 15, wherein the floor segments are pivotably connected to the flexible buffer cross-beam by vertical axes.

28. The floor of a dome module according to claim 15, wherein the flexible buffer cross-beam is made of a flexible material.

* * * * *

UNITED STATES PATENT AND TRADEMARK OFFICE
CERTIFICATE OF CORRECTION

| | | |
|---|---|---|
| PATENT NO. | : 9,003,589 B2 | Page 1 of 1 |
| APPLICATION NO. | : 13/197484 | |
| DATED | : April 14, 2015 | |
| INVENTOR(S) | : Detlef Gutkuhn et al. | |

It is certified that error appears in the above-identified patent and that said Letters Patent is hereby corrected as shown below:

On the Title Page
(30) Foreign Application Priority Data
Replace "(DE)" with --(EP)--.

Signed and Sealed this
Twenty-fifth Day of August, 2015

Michelle K. Lee
*Director of the United States Patent and Trademark Office*